R. B. SOMERS.
METAL CLAMP.
APPLICATION FILED MAR. 30, 1917.
1,260,826.
Patented Mar. 26, 1918.
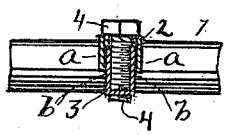
Fig. 1.
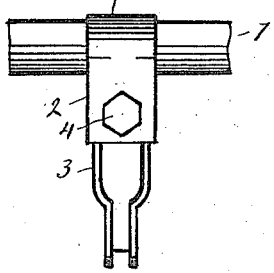
Fig. 2.
Fig. 3.
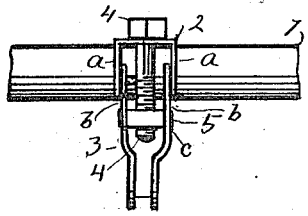
Fig. 4.
Inventor
Roy B. Somers
By
Attorney

UNITED STATES PATENT OFFICE.

ROY B. SOMERS, OF ZEELAND, MICHIGAN, ASSIGNOR TO THE FEDERAL TOOL & STAMPING COMPANY, OF ZEELAND, MICHIGAN.

METAL CLAMP.

1,260,826.        Specification of Letters Patent.        Patented Mar. 26, 1918.

Application filed March 30, 1917. Serial No. 158,759.

*To all whom it may concern:*

Be it known that I, ROY B. SOMERS, a citizen of the United States, residing at Zeeland, in the county of Ottawa and State of Michigan, have invented certain new and useful Improvements in Metal Clamps, of which the following is a specification.

My invention relates to improvements in clamps for securing levers or handles to shafts, rods, &c., and its object is to provide a cheap, durable and very efficient clamp that may be made to clamp a bar or rod so firmly as to avert the danger of slipping on the rod.

I attain this result by the mechanism and arrangement of parts shown in the accompanying drawing, in which Figure 1 shows the lever part of the clamp in section, and the securing bolt screwed, at the lower end, into the plate from which the clamp is made. Fig. 2 is a side elevation of the clamp showing a nut mortised into the sides of the clamp. Fig. 3 is a plan of the clamp assembled and clamping a rod, and Fig. 4 is an end elevation of the clamp shown in Fig. 2.

Similar reference numerals indicate similar parts throughout the several views.

This clamp is made of sheet metal and is formed upon a punch press with properly constructed forming and stamping dies, thus reducing the cost of production to the minimum, and raising its clamping efficiency to the maximum.

This clamp is made up of the short or upper wing 2, which is made U form and is designed to pass over the sides of the body 3 of the clamp, which is, also, made U form and, in the better class of clamps, has holes made through the sides to receive and support the nut 5, as shown in Figs. 2 and 4, and a bolt or screw, as 4, is passed through the upper part of the wing 2 and screwed through the nut 5 until the flat or clamping part 6 is made to clamp the shaft or rod 1 so firmly as to render it practically impossible for the clamp to slip on the rod.

For a cheaper form of clamp I dispense with the nut 5 and pass the bolt or screw 4 directly to, and screw it through the lower plate of the part 3, as indicated in Fig. 1.

When the form shown in Fig. 1 is used I make the walls *b* close enough together so that when cutting the screw thread through the lower wall the threads will be impressed into the side walls so that greater strength and security will be produced than if the bolt 4 simply screwed through the lower wall. To more fully strengthen this feature in the clamp the sides *a*, *a* should be close enough together to press heavily upon the sides *b*, of the part 3 so that there can be no posibility of the bolt, when drawn very firmly in place, spreading the sides *b*, of the part 3 and lessening the efficiency of the threads therein upon the bolt. When the form of clamp shown in Figs. 2 and 4 is used it is not necessary to embed the screw threads into the sides of the part 3, as the nut 5 is sufficiently broad to sustain the full strain of the bolt when the clamp is firmly clamped around the rod 1, but it is well to have the sides *a*, *a* of the part 2 fit very closely against the sides of the part 3 so there can be no possibility of the sides *b* spreading and allowing the ends of the nut to draw out of the mortises, or holes *c* in the sides *b*. By this means an ordinary "stock" bolt and nut may be used, while, without the proper support at the upper edges of the sides *b*, *b* it would be necessary to make a specially formed and, consequently, a much more expensive nut for the purpose.

What I claim as new, and desire to secure by Letters Patent of the United States, is:

1. A clamp made of sheet metal made up with a cylindrical clamping part, an upper U shaped part, a lower U shaped arm with the sides of the lower arm between the sides of the upper part, a nut mounted between the sides of the lower arm, and a bolt passed through the upper wall of the upper part and screwed through the nut.

2. In a metal clamp, a cylindrical clamping part, having an upper part made U shaped, and a lower arm made U shaped, all of sheet metal, the U sides of the upper part passed over the sides of the lower arm, and a bolt passed through the upper wall and arranged to connect with the lower arm to draw the two parts together and clamp the cylindrical part around a cylindrical rod.

Signed at Zeeland Michigan March 17 1917.

ROY B. SOMERS.